J. R. FULMER.
MOWER.
APPLICATION FILED FEB. 21, 1910.
1,025,262.
Patented May 7, 1912.
3 SHEETS—SHEET 1.
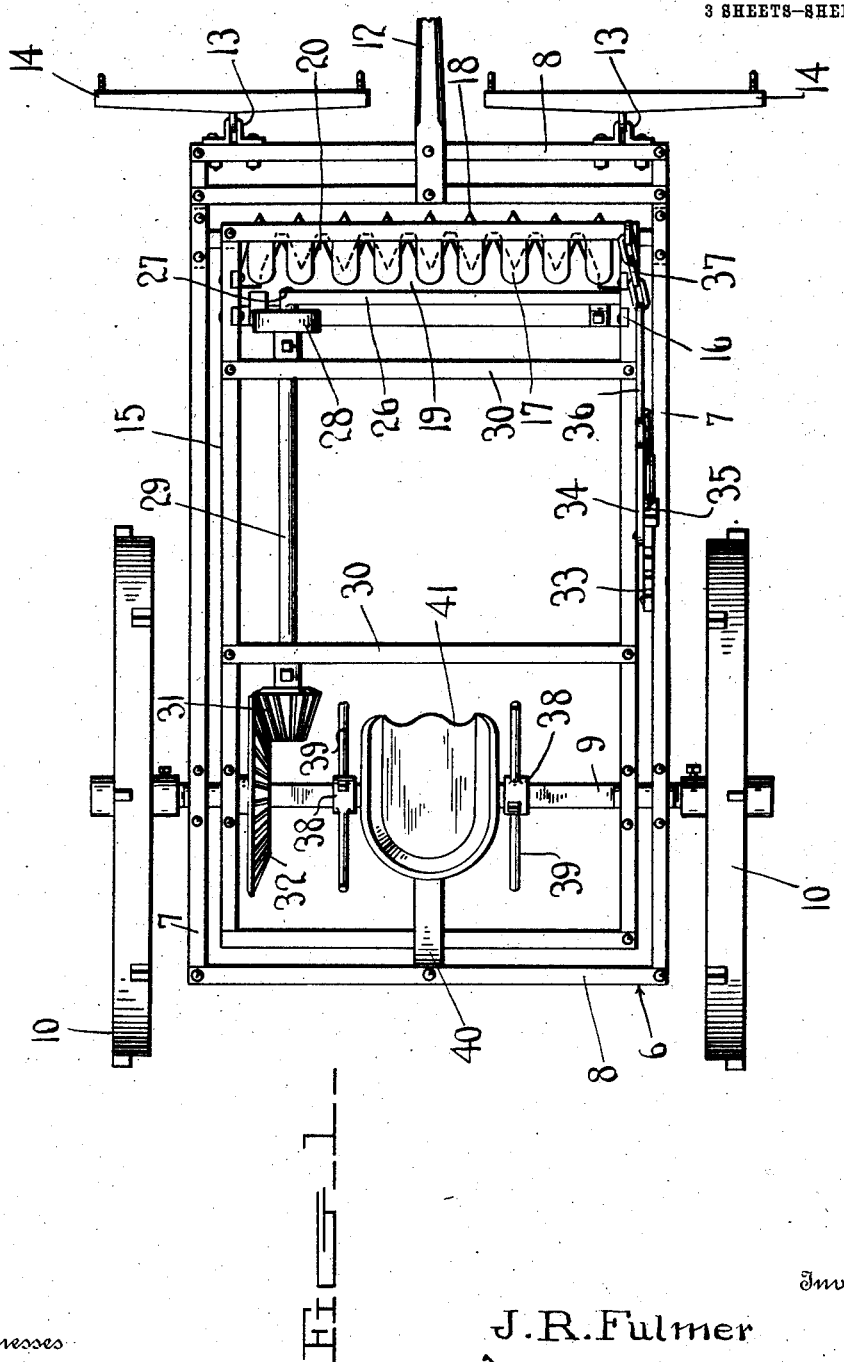
Witnesses
L. B. James
F. O. Parker
Inventor
J. R. Fulmer
By Chandler & Chandler
Attorneys

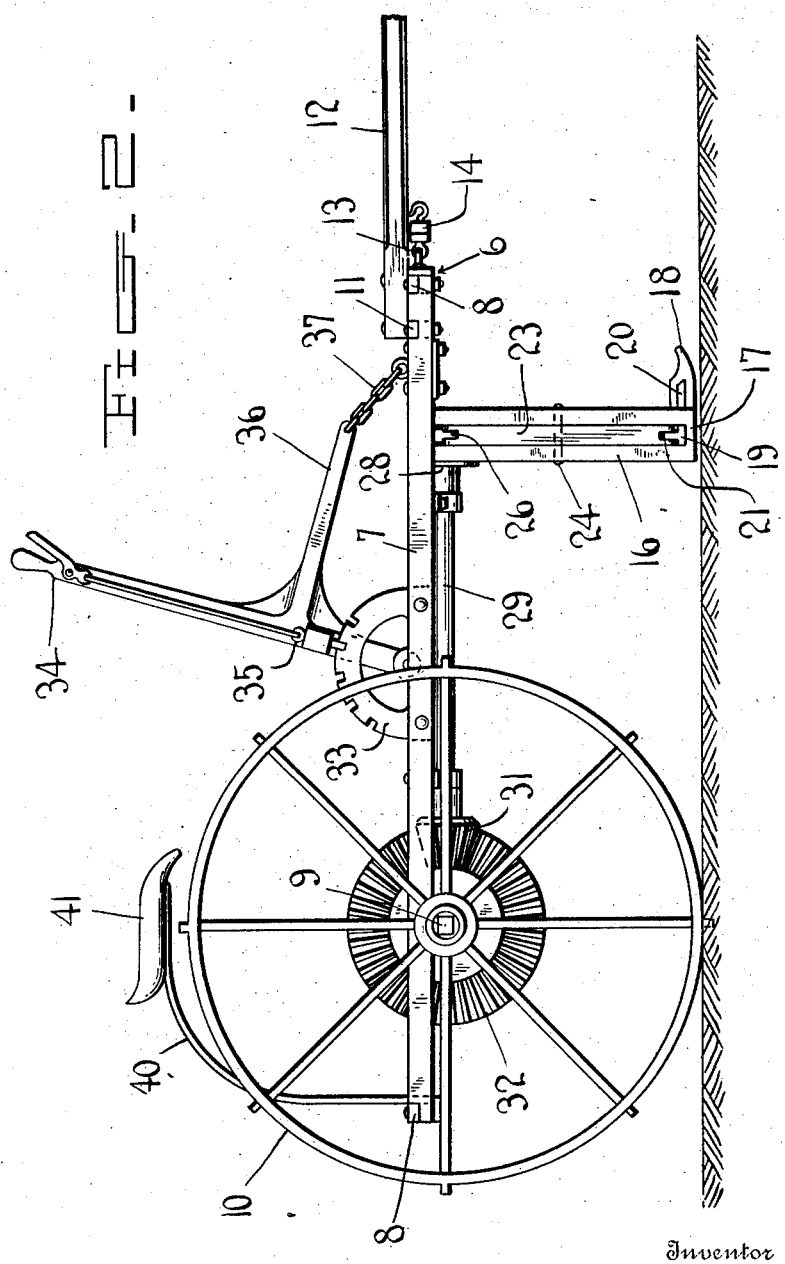

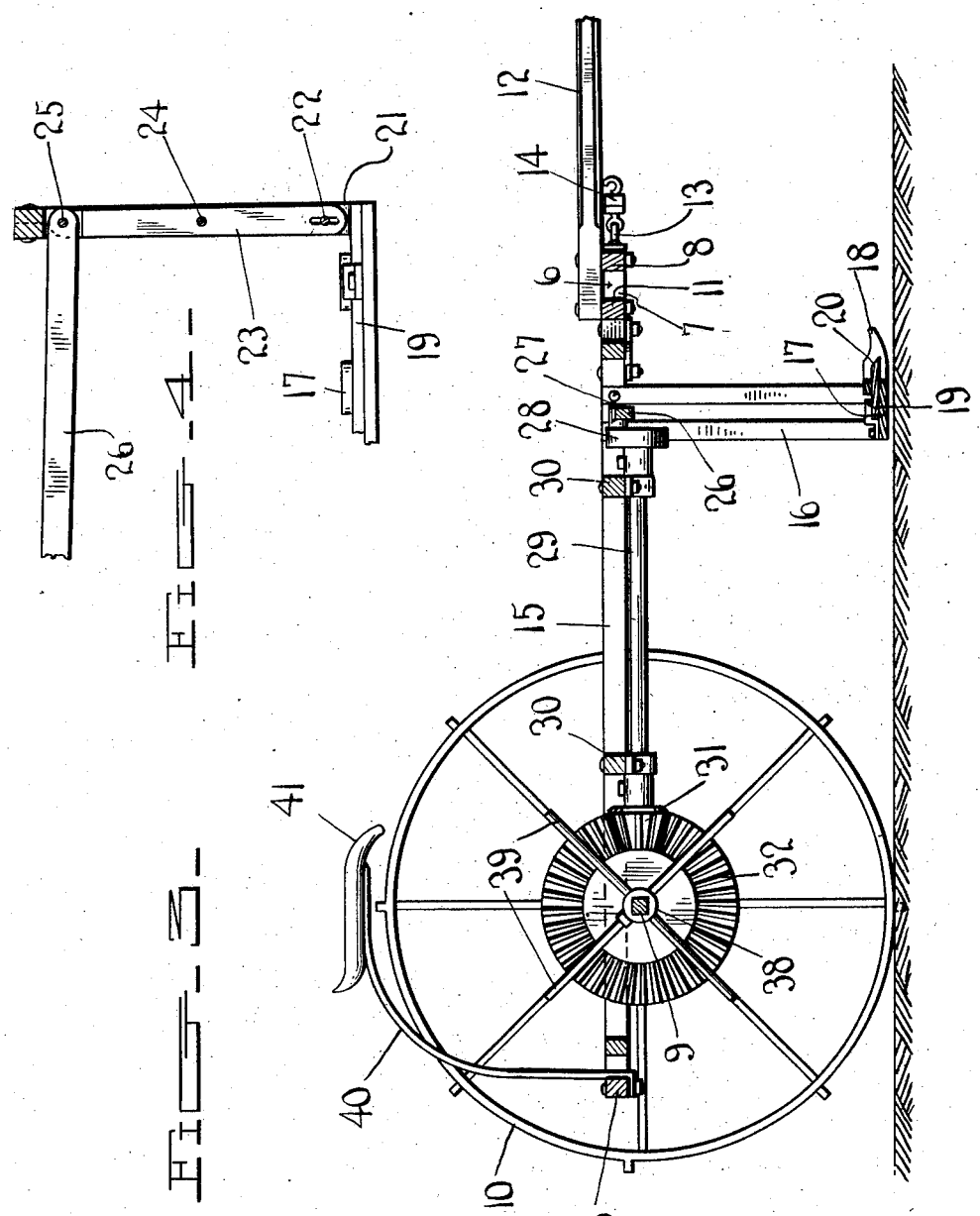

UNITED STATES PATENT OFFICE.

JAMES R. FULMER, OF SPRINGFIELD, SOUTH CAROLINA.

MOWER.

1,025,262.  Specification of Letters Patent.  Patented May 7, 1912.

Application filed February 21, 1910. Serial No. 545,105.

*To all whom it may concern:*

Be it known that I, JAMES R. FULMER, a citizen of the United States, residing at Springfield, in the county of Orangeburg, State of South Carolina, have invented certain new and useful Improvements in Mowers; and I do hereby declare the following to be a full, clear, and exact description of the invention, such as will enable others skilled in the art to which it appertains to make and use the same.

The invention relates to a mowing machine and more particularly to the class of vine cutting machines.

The primary object of the invention is the provision of a machine of this character in which vines or growing plants may be cut down and pulled rearwardly of the machine so as to prevent the tangling of the vines or plants with the cutter mechanism of the machine as the latter is advanced through a field.

Another object of the invention is the provision of a machine of this character in which the cutter frame is capable of adjustment relative to the ground so that vines or weeds may be cut close to the earth or at a predetermined height therefrom during the forward travel of the machine.

A further object of the invention is the provision of a machine in which the cutter mechanism is operated through the medium of connection with the ground wheels on the rotation thereof when the machine is being advanced through a field.

With these and other objects in view, the invention consists in the construction, combination and arrangement of parts as will be hereinafter more fully described in detail, illustrated in the accompanying drawings, which disclose the preferred form of embodiment of the invention, to enable those skilled in the art to practise the same, and as brought out in the claims hereunto appended.

In the drawings:—Figure 1 is a top plan view of a machine constructed in accordance with the invention. Fig. 2 is a side elevation thereof. Fig. 3 is a vertical longitudinal sectional view through the same. Fig. 4 is a fragmentary transverse sectional view through the cutter frame showing the rocking lever for operating the cutter bar.

Similar reference characters indicate corresponding parts throughout the several views in the drawings.

Referring to the drawings by numerals, 6 designates the main frame of the machine which is preferably of rectangular shape comprising longitudinal side beams 7, united at opposite ends to front and rear end beams 8, and near the rear end of this main frame 6, is mounted in suitable bearings, a rotatable axle 9, to opposite ends of which are fixed the usual ground wheels 10, the wheels being secured to the axle in any ordinary well known manner.

Adjacent to the front end beam 8, is a cross bar 11, to which latter and the front end beam is centrally secured a forwardly directed draft pole or tongue 12, and also to the said front beam 8, near opposite ends thereof, are secured clevises 13, to which are connected swingletrees 14, to which are adapted to be attached draft animals for the advancement of the machine through a field. Upon this rotatable axle 9, is loosely mounted a vertically swinging supplemental frame 15, the same being suitably journaled upon the axle 9, near its rear end and this frame 15, has depending from its forward end spaced vertical legs 16, the latter arranged in pairs and in parallel relation to each other, the legs at their lower ends being connected to and supporting a stationary finger bar 17, provided with the usual forwardly directed fingers 18, and upon the upper face of this finger bar 17, is slidably mounted a cutter bar 19, the cutting teeth 20, of which are adapted to reciprocate through the fingers 18, during the cutting action of the cutter bar.

Rising from one end of the cutter bar 19, is a perforated lug 21, the latter having passed therethrough a pivot pin 22, the same loosely engaging the elongated slot formed in a forked end of a rocking lever 23, centrally pivoted as at 24, between one pair of the legs 16, and to the upper end of this lever is pivoted as at 25, one end of a pitman rod 26, the other end of which being eccentrically connected as at 27, to a rotatable disk 28, fixed to one end of a driven shaft 29, the same being suitably journaled in cross beams 30, mounted upon the swinging frame 15, intermediate the ends thereof, and this driven shaft 29, has fixed thereto a beveled pinion 31, meshing with a beveled gear 32, fixed upon the axle 9, carrying the ground wheels of the machine.

To one longitudinal side beam 7, of the main frame 6, is mounted a toothed segment 33, to which is pivoted the lower end of a throw lever 34, the same being provided with a spring controlled locking dog 35, normally engaging the toothed segment, and this lever 34, is also provided with a right angular forwardly directed arm 36, to the outer end of which is loosely connected a chain 37, the same being also connected to the forward end of the swinging frame 15, so that upon moving the throw lever, the swinging frame may be raised or lowered to the desired degree whereby the cutter bar will be adjusted relative to the ground.

Fixed to the axle 9, are weed or vine pulling devices each comprising a hub 38, having projecting therefrom radial fingers 39, which latter engage the cut vines or weeds so that during the rotation of the axle the said fingers will cast the weeds rearwardly of the machine and thus prevent the tangling or twisting of the said weeds or vines upon the finger bar or other adjunct parts of the said machine.

Rising from the rear end beam 8, centrally of the main frame, is a seat post 40, carrying the usual seat 41, to be occupied by the operator of the machine.

It is apparent that on the rotation of the axle 9, the motion therefrom will be imparted to the cutter bar through the medium of the driven shaft 29, and its connection between the axle and the said cutter bar, whereby the latter will be reciprocated upon the finger bar for cutting action which is continuous during the forward travel of the machine.

What is claimed is:—

1. A machine of the class described comprising a main frame, a wheeled axle supporting said frame, a supplemental frame pivoted on said axle, downwardly extending spaced legs secured to said supplemental frame, a cutter bar supported by the lower end portions of said legs, said legs and cutter bar forming a skeleton frame wherethrough cut vines can escape rearwardly without obstruction, a cutter bar actuating lever pivotally supported between two of said legs, and shielded by said legs from clogging with cut vines, means for rocking said lever to actuate said cutter bar, and means for manipulating said supplemental frame whereby to adjust said cutter bar relatively to the ground.

2. A machine of the class described comprising a main frame, a wheeled axle supporting said frame, a supplemental frame pivoted on said axle, oppositely disposed downwardly extending spaced legs secured to the sides of said supplemental frame, a cutter bar supported by the lower end portions of said legs, a rocking cutter bar actuating lever pivotally supported between two of said legs and adapted for rocking movement between said legs whereby said lever is shielded by said legs from clogging with cut vines, means for rocking said lever to actuate said cutter bar, and means for manipulating said supplemental frame whereby to adjust said cutter bar relatively to the ground.

3. A machine of the class described comprising in combination, a horizontal main frame, a wheeled axle supporting said frame, a cutter bar, a skeleton frame depending from the forward end of said main frame and permitting of the unobstructed escape rearwardly of cut vines over said cutter bar, said cutter bar being located at the bottom of the depending portion of the frame and a series of radial fingers on said axle having a constant rotary movement and operating to pull cut vines rearwardly from said cutter bar.

4. A machine of the class described comprising a main frame, a wheeled axle supporting said frame, a swinging frame mounted within the main frame, spaced legs depending from the swinging frame, a cutter bar mounted upon the lower end portions of said legs, driven connections between the cutter bar and the axle operated by said axle, pulling fingers fixed to and radially projecting outwardly from said axle and operating to pull severed vines rearwardly from said cutter bar, said fingers having a constant rotary movement with said axle, and an operating lever secured to the main frame having connection with the swinging frame and adapted to manipulate the swinging frame whereby to maintain the cutter bar in various adjusted positions relatively to the ground.

In testimony whereof, I affix my signature, in presence of two witnesses.

JAMES R. FULMER.

Witnesses:
S. T. FULMER,
C. M. PENDER.

---

Copies of this patent may be obtained for five cents each, by addressing the "Commissioner of Patents, Washington, D. C."